United States Patent [19]

Kaneko et al.

[11] Patent Number: 4,923,768

[45] Date of Patent: May 8, 1990

[54] FUEL CELL POWER GENERATION SYSTEM

[75] Inventors: Hideo Kaneko, Yokohama; Hideo Nishigaki, Ichihara, both of Japan

[73] Assignee: Fuji Electric Co., Ltd., Japan

[21] Appl. No.: 395,260

[22] Filed: Aug. 17, 1989

[30] Foreign Application Priority Data

Aug. 22, 1988 [JP] Japan .................. 63-207897

[51] Int. Cl.$^5$ .................................. H01M 8/06
[52] U.S. Cl. ........................... 429/19; 429/25; 429/26
[58] Field of Search ............... 429/19, 17, 13, 26, 429/12, 20, 25, 34

[56] References Cited

U.S. PATENT DOCUMENTS

| | | | |
|---|---|---|---|
| 3,976,507 | 8/1976 | Bloomfield | 429/19 X |
| 4,128,700 | 12/1978 | Sederquist | 429/17 |
| 4,622,275 | 11/1986 | Noguchi et al. | 429/19 |
| 4,683,177 | 7/1987 | Kinoshita et al. | 429/26 |
| 4,686,157 | 8/1987 | Miyake et al. | 429/19 |
| 4,738,903 | 4/1988 | Garow et al. | 429/19 X |
| 4,759,997 | 7/1988 | Ohyauchi et al. | 429/19 |
| 4,838,020 | 6/1989 | Fujitsuka | 429/13 X |

Primary Examiner—Anthony Skapars
Attorney, Agent, or Firm—Brumbaugh, Graves, Donohue & Raymond

[57] ABSTRACT

In order to improve the efficiency of a fuel cell power generation system and its ability to adjust to disturbing factors which may occur during operation, a motor driven compressor for providing reaction air to the fuel cell system is driven independently of a power recovery system which recovers energy lost in operational by-products and converts the energy into electrical power. The independent motor driven compressor provides a stable supply of reaction air to the fuel cell and aids in shortening the time necessary for system start up.

9 Claims, 2 Drawing Sheets

FUEL CELL POWER GENERATION SYSTEM

BACKGROUND OF THE INVENTION

The present invention relates to a fuel cell power generation system combining a fuel cell and a fuel reformer. A fuel cell generation system combines, as is well known, a fuel cell and a fuel reformer and generates power by supplying both a fuel gas including a large amount of hydrogen obtained, for example, by stream reformation of a natural gas and air extracted from the atmosphere as an oxidizing agent to the fuel cell.

Development of a pressurized fuel cell power generation system, which is to be operated with a cell operating pressure enhanced to about 4~7 kg/cm$^2$G from about 0.5 kg/cm$^2$G in the prior art, has recently been continued with the objective of realizing improvement in the power generation efficiency of a fuel cell.

Such a pressurized fuel cell power generation system requires an air compressor for supplying pressurized air extracted from the atmosphere to the fuel cell, and also requires a large power source to drive this compressor. In order to improve efficiency of the power generation system, a system has already been developed, and put into practical use, which utilizes heat in the system and exhaust gas from the reformer combustion as a power source to drive a turbo compressor for pressurizing the reaction air.

A process flowchart of a fuel cell power generation system described previously as the prior art is shown in FIG. 3. FIG. 3 illustrates, among other things, a fuel cell 1, a reformer 2, a turbo-compressor 3, an extra combustion chamber 4, a steam separator 5 and a pump 6 which circulates cooling water through the fuel cell, and the steam separator 5.

In FIG. 3, the natural gas used as a raw material for reforming is steam-reformed by the reformer 2 and is then supplied, as fuel gas including a large amount of hydrogen, to a gas space in the anode side of the fuel cell 1. The reaction air, as the oxidating agent, is pressurized by a compressor 3a of the turbo-compressor 3 and is then supplied to a gas space in the cathode side of the fuel cell 1, thereby enabling fuel cell 1 to generate electrical power. The off fuel gas and off air exhausted from the fuel cell 1 are supplied to a burner 2a of the reformer 2. These gases are burned to provide the necessary reforming reaction heat. The steam required for the reforming reaction is obtained from the steam separator 5. Moreover, as a driving source of turbine 3b of the turbo-compressor 3, high temperature off air exhausted from the fuel cell and extra high temperature steam, obtained by heating excess steam from the steam separator 5, are added to the combustion exhaust gas of the pressurized combustion furnace of reformer 2. This combination of high temperature and high pressure fluids is further heated in the extra combustion chamber 4 and is used to drive the turbocompressor 3 by guiding the extra combustion chamber exhaust gas to a turbine 3b.

The power generation system can be started by the following procedures. The burner of reformer 2 is first fired in order to raise the furnace temperature and pressure up to a predetermined value. The turbo-compressor 3 is then started by air supplied from an air source provided separately or externally and power generation is started by supplying fuel gas and air to the fuel cell 1. Upon confirmation that the fuel cell operation voltage has reached its operating level, the power output of the fuel cell is coupled to the power system.

Fuel cell power generation systems of the prior art are subject to certain problems. Namely, the power generation system of the prior art provides input energy for the turbo compressor 3 by directing the exhaust gas from the combustion of the reformer 2 to the turbo compressor and forms a closed loop, as previously explained, by increasing the reaction air pressure to be supplied to the fuel cell 1 with the output of the compressor. Therefore, if an interrelated control is not carried out in such a manner as to keep an adequate balance in the flow rate, pressure, and temperature of fluids flowing into each section of the system, especially during start-up and stopping of the power generation system and when disturbing factors such as variation of load occur, the pressure distribution of the system as a whole is changed and imbalances in pressure levels within the fuel cell and surging of the turbo compressor result.

To avoid these effects, a prior art turbo-compressor has generally been operated at a constant pressure and flow rate in order to prevent surging of the turbo-compressor and pressure variations and imbalances within the fuel cell. However, if operation of the reformer 2 is controlled according to changes in load, the temperature and pressure of the combustion exhaust gas used as a power source for the turbo-compressor 3 also changes. Moreover, the volume of air in the system functions as a buffer for very fast changes of load and results in a reduction in the flow rate of exhaust gas to the turbo-compressor within a short period. Accordingly, if countermeasures are not taken, energy to drive the exhaust turbine 3b of the turbo-compressor 3 becomes insufficient when a load change occurs. Especially, in a partial load, the outlet pressure of the compressor 3b changes and causes the reaction air pressure being supplied to the fuel cell to be reduced. This results in pressure differences within the fuel cell which are likely to damage the fuel cell.

The insufficient source of power for the turbocompressor 3 during a partial load has been addressed by employing a means of raising the temperature of the combustion exhaust gas of the reformer by inputting extra steam and supplying a fuel such as natural gas to an extra combustion chamber 4, as is shown in FIG. 3. However, even though the fuel cell itself has a higher power generation efficiency in the partial load operation, the system mentioned above, which employs an extra combustion chamber 4 in order to compensate for insufficient power energy of the turbo-compressor 3, will result in a lowered power generation efficiency of the power generation system as a whole because of the energy consumed in operating the added chamber 4. Moreover, from the point of view of the operation of the power generation system, employment of a turbo-compressor requires another external or supplemental air source for starting the turbo-compressor, and the reaction air cannot be supplied to the fuel cell 1 until after the turbo-compressor 3 has started operation. Moreover, the turbo-compressor requires, in general, careful starting operation in order to prevent surging, thus it takes a considerable period until reaction air pressure is raised up to the rated pressure. As a result, it is considered a factor in lengthening the starting time of the power generation system and also in limiting the ability to respond to load variations.

SUMMARY OF THE INVENTION

It is an object of the present invention to provide a fuel cell power generation system which enhances response to load variations by preventing disturbances to the reaction air system by factors such as system start-up and variation of load. A further object of the present invention is to improve power generation efficiency of the system as a whole by providing a stable supply of pressurized air, particularly during start-up and load variation conditions, by effectively collecting heat energy exhausted from the power generation system and by improving partial load efficiency.

In order to solve the problems explained above, the fuel cell power generation system of the present invention comprises a motor-driven compressor for raising the reaction air pressure to be supplied to the fuel cell, a gas turbine which is driven by a high temperature and high pressure gas essentially consisting of combustion exhaust gas of the reformer, and a power generator for secondary electrical power.

The fuel cell power generation system additionally comprises a steam turbine which is driven by extra steam generated by collecting exhaust heat of the fuel cell and a power generator for generating secondary electrical power. In addition, the fuel cell power generation system of the present invention comprises an air pressure control circuit means having a pressure sensing device on the outlet side of the compressor and a flow rate control valve on the inlet side of the compressor. The control circuit serves to improve partial load efficiency by allowing the adjustment of reaction air flow to maintain constant reaction air pressure in the fuel cell.

The fuel cell power generation system of the present invention further comprises a variable nozzle in the inlet side of the gas turbine for adjusting an inlet angle of gas flowing into the gas turbine to offset changes in inflow gas quantity caused by changes in operational load.

With the configuration described previously, the reaction air supplied to the fuel cell is rapidly pressurized up to the operating pressure of fuel cell by the motor-driven compressor which operates on reception of power from an external power system. Meanwhile, the combustion exhaust gas of the reformer and the stored energy of the extra steam in the system drive a gas turbine and steam turbine and effectively recover energy from by-products of operation of the system which is used to generate secondary power through the power generator.

Changes in combustion exhaust gas output of the reformer resulting from disturbing factors such as load change or change in quantity of extra steam in the system only changes the power of the gas turbine and the steam turbine which drive the power generating means for power collection through secondary power generation and do not directly influence the reaction air system. The reaction air is pressurized up to the predetermined pressure by the motor-driven compressor and is then stably supplied to the fuel cell independently of turbine operation.

Axial power of the reaction air compressor is controlled in order to maintain a predetermined outlet pressure at a constant value, or within a desired range, by controlling a flow rate valve connected to the inlet side of the compressor which is effective, for example, in lowering the flow rate during the partial load operation. The axial power of the compressor during the partial load operation can also be lowered by control of the drive motor and the partial load efficiency can be improved.

The variable nozzle provided in the inlet side of gas turbine is adjusted so that deterioration of gas turbine characteristics due to the change of inflow gas quantity resulting from changes in operational load can be minimized. As a result, the collecting power of the gas turbine can be improved and the partial load efficiency can also be improved.

BRIEF DESCRIPTION OF THE DRAWINGS

Further objects and advantages of the invention will be apparent from a reading of the following description in conjunction with the accompanying drawings in which.

The same reference numbers are used in FIG. 1, FIG. 2 and FIG. 3. Arrows indicate the flow of fluid between the different components.

DESCRIPTION OF THE PREFERRED EMBODIMENTS

Figure 1:
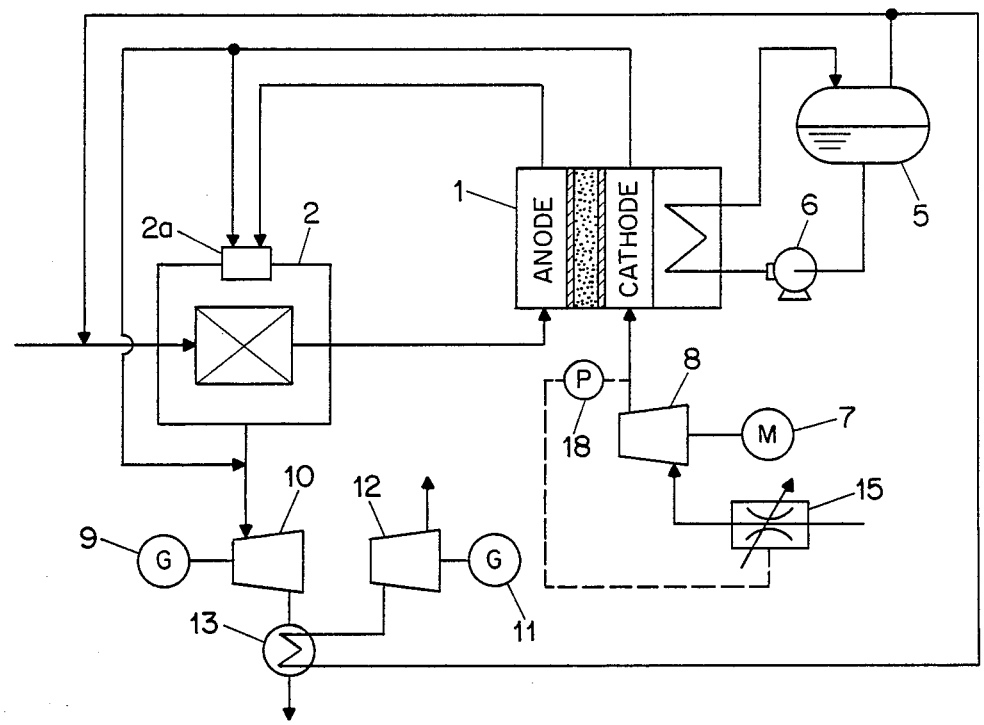
FIG. 1 is a process flow diagram of a fuel cell power generation system indicating different embodiments of the present invention.

In the embodiment of FIG. 1, the motor-driven compressor 8 for pressurizing the reaction air is connected to the inlet side of a gas space in the cathode side of the fuel cell 1. A flow rate control valve 15 is connected to the inlet side of the compressor 8 and a pressure gauge 18 for detecting or sensing the air pressure is provided in the outlet side of the compressor 8. A gas turbine 10, for driving the power generator 9 for power collection, is connected by piping to the exhaust side of the reformer 2, and a steam turbine 12, for driving a power generator 11 for power collection, is also connected by piping to a steam separator 5 provided in the cooling system of the fuel cell 1. The reference numeral 13 designates a steam heater for super heating the saturated steam obtained from the steam separator 5 with the exhaust gas of gas turbine 10. The motor 7 which drives the reaction air compressor is operated by receiving power from an external power system, and the power generated by the power generators 9 and 11 for collecting power is returned to the external power system.

Operation of the fuel cell power generation system of this configuration will now be described. The reaction air extracted from the atmosphere is pressurized up to the fuel cell operating pressure by a compressor 8 which is driven by a motor 7 and is then supplied to the gas space in the cathode side of fuel cell 1. Moreover, the fuel gas reformed with steam in the reformer 2 is supplied to the gas space in the anode side of the fuel cell causing the fuel cell 1 to generate electrical power.

As shown in FIG. 1, the required pressure and flow rate of reaction air supplied to the fuel cell 1 can be attained on a stable basis and without relation to disturbing factors such as operating state of reformer 2 and changes in the quantity of steam generated by the steam separator 5. The disturbing factors may occur during operation of the power generation system but particularly may occur during start-up and load variations. Moreover, since compressor 8 of the reaction air system and the turbine 10 driven by the combustion exhaust gas of reformer 2 are separated and operate independently of each other, they may be started and operated individually. The compressor 8 may be started individually even before the temperatures of the reformer and fuel cell cooling system become sufficient to start the turbine 10. Thus, start up time for the power generation system as a whole can be decreased. Moreover, since the compressor 8 is driven by an electric motor 7, the pressure can be increased up to the predetermined value within a short period without requiring any additional starting device or supply of pressurized air.

Figure 2:
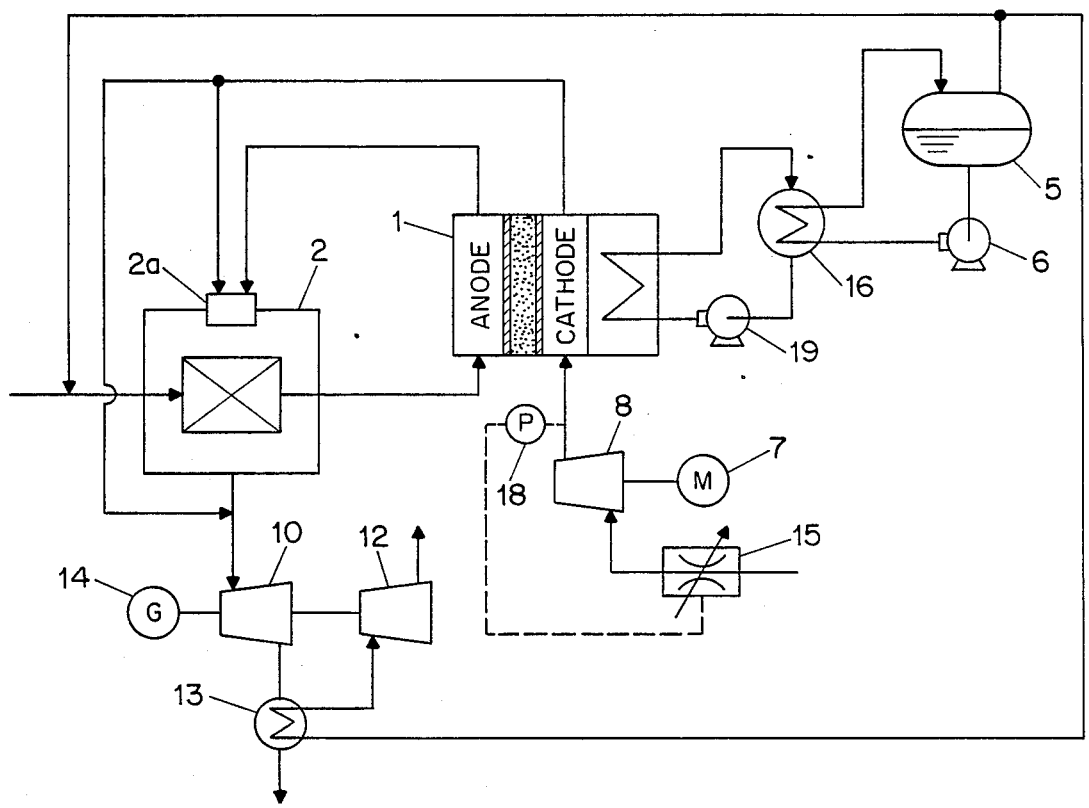
FIG. 2 is a diagram similar to FIG. 1 showing the gas turbine and steam turbine coupled to drive one single generator and also showing an additional means of cooling the fuel cell.
Figure 3:
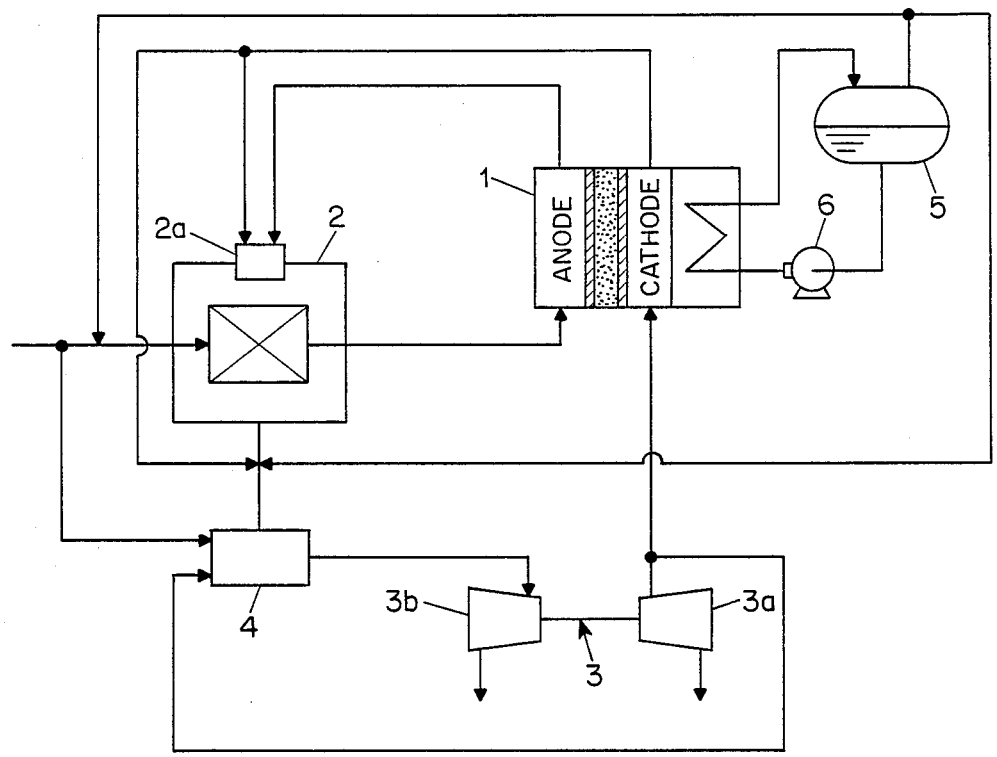
FIG. 3 is a process flow diagram of a typical fuel cell power generation system known in the prior art.

For the embodiment shown in FIGS. 1 and 2, the axial power of compression 8 can be reduced while maintaining the predetermined outlet pressure, and the partial load efficiency of the power generation system can be improved, by operation of the air pressure control circuit. As shown, this control circuit includes a flow rate control valve 15 in the inlet side of the compressor 8 and maintains the flow rate control valve 15 in the constant flow rate region during partial load conditions by operation of the air pressure control circuit.

As shown, the off fuel gas and off air output from the fuel cell 1 are burned in a burner 2a of the reformer, and the exhaust gas and the off air bypassing the burner 2a are used to drive the gas turbine 10. Steam generated by the steam generator 5 with the exhaust heat of fuel cell 1 is partly supplied to the reformer 2 and used for steam reforming of natural gas into fuel gas. The extra steam is then supplied to the steam turbine 12 through a steam heater 13 and is used to drive the steam turbine. Thus, the energy of by products produced as a result of system operation which is in the form of steam, generated in cooling the fuel cell, and high temperature and high pressure gas, essentially consisting of the combustion exhaust gas of reformer 2, can be recovered effectively by the power generators 9 and 12 in the form of electrical power. This power is termed "secondary" power to distinguish it from power generated directly by the fuel cell.

Figure 4:
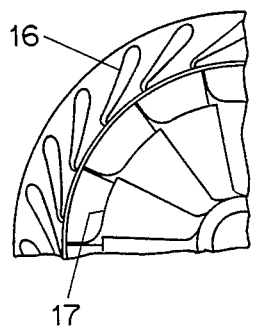
FIG. 4 is a schematic view of a turbine with a variable nozzle adjustment.

FIG. 4 is a cross-sectional view of the gas turbine inlet. In this figure, the gas inlet angle to the turbine blade 17 can be controlled, resulting in increased power collection by power generation means 9 and improved partial load efficiency. Such control being based on changes in inlet gas flow volume resulting from changes in operational load.

FIG. 2 is a further embodiment of the system in FIG. 1, differing in that the gas turbine 10 and steam turbine 12 are mechanically coupled on the same axis and the power generator 14 for power collection is driven by both turbines. Also, as shown in FIG. 2, the hot water circulation system for cooling fuel cell 1, including the steam separator 5, executes the heat exchange through a coolant flowing through a closed loop cooling system which transfers heat to the steam separator through a heat exchanger 15. The reference numeral 19 designates a coolant circulation pump for the closed loop fuel cell cooling system.

As described in FIG. 2, the present invention provides advantages, in addition to the beneficial effects provided in FIG. 1, in that only one power generator 14 is necessary for power collection and it is possible to select a coolant for use in the closed loop fuel cell cooling system which has high corrosion resistance and heat conductivity.

FIG. 1 and FIG. 2 show basic examples and the present invention allows some changes or modifications in piping system for collecting heat in the system.

The fuel cell power generation system of the present invention provides the following benefits. Namely: (1) since a compressor for pressurizing reaction air, previously consisting of a turbo-compressor driven by combustion exhaust gas of the reformer, is replaced with an independent motor-driven compressor, disturbing factors such as start up and load variation in the power generation system are isolated from the reaction air supply system and the reaction air to the fuel cell can be pressurized up to a predetermined pressure rapidly and can be stably maintained; (2) a compressor for pressurizing reaction air and a drive turbine for driving a power collection generator can be started and operated independently of each other so that the compressor for pressurizing reaction air can be started individually without relation to either the temperature condition of the reformer or the fuel cell cooling system, thus, conditions such as combustion exhaust gas temperature and extra steam quantity of the reformer do not affect the independent reaction air compressor although the temperature condition of the reformer and fuel cell cooling system may not be sufficient to start the turbine, and as a result of such component independence the starting time of the power generation system as a whole can be improved and the load response characteristic can also be improved; (3) the energy of the combustion exhaust gas of the reformer and the extra steam in the system can be recovered and effectively recycled as electrical power, thereby improving power generation efficiency of the power generation system as a whole; (4) the axial power to the compressor from the motor can be reduced, while maintaining the predetermined reaction air pressure, by detecting the outlet pressure of the compressor for pressurizing reaction air, controlling the flow rate control valve connected to the inlet side of the compressor in the low flow rate area during the partial load operation, and by controlling the power of compressor so as to keep an outlet pressure to a constant value, thereby improving the partial load efficiency of the power generation system; and (5) turbine efficiency under partial load conditions can be improved by optimumly adjusting, for each flow rate, the inlet angle of gas from a variable nozzle provided in the inlet side of the gas turbine to the turbine blade for change of flow rate in the partial load operation.

While there have been described what are at present preferred embodiments of this invention, it will be obvious to those skilled in the art that various changes and modifications may be made therein without departing from the invention and it is, therefore, intended to cover all such changes and modifications as fall within the true spirit and scope of the invention. For example, it is apparent that a plurality of fuel cells, such as cell 1 indicated in FIG. 1, can be arranged in series to provide power at any output voltage which is a multiple of a single fuel cell voltage. In such a system, the illustrated embodiments of the present invention can be modified so that individual ancillary units, such as the reformers, generators and compressors shown in FIGS. 1 and 2, support a plurality of individual fuel cells.

We claim:

1. A fuel cell power generation system comprising:
a fuel cell;

fuel reformer means coupled to said fuel cell for supplying fuel gas;

motor driven compressor means coupled to said fuel cell for supplying pressurized reaction gas to said fuel cell;

and power generator means including turbine means arranged for utilization of energy recovered from by-product fluids resulting from operation of the fuel cell system for secondary power generation;

whereby, improved efficiency is achieved by providing a stable supply of pressurized reaction gas from a compressor driven by power from an external power system and by returning power to the external power system from a secondary power generator driven by a turbine using energy recovered by by-products of operation of the fuel cell system.

2. A fuel cell power generation system according to claim 1, wherein said generator means additionally comprises a gas turbine, driven by exhaust gases from said fuel reformer means, which drives an electric power generator for production of power which is returned to said external power system.

3. A fuel cell power generation system in accordance with claim 1 or claim 2, wherein said generator means additionally comprises a steam turbine, driven by excess steam produced in cooling said fuel cell, which drives an electric power generator for production of power which is returned to said external power system.

4. A fuel cell power generation system in accordance with claim 2, wherein said generator means additionally comprises a steam turbine, driven by excess steam produced in cooling said fuel cell, which is mechanically coupled to said gas turbine so as to also drive said electric power generator.

5. A fuel cell power generation system comprising:
a fuel cell
fuel reformer means coupled to said fuel cell for supplying fuel gas reformed from natural gas;
motor driven compressor means coupled to said fuel cell for supplying pressurized air to said fuel cell;
air pressure control circuit means for sensing air pressure at the outlet side of said compressor means and controlling air flow through said compressor means;
and electric power generator means comprising gas turbine means arranged for utilization of energy recovered from exhaust gases resulting from operation of said fuel reformer means for secondary power generation;
whereby, improved efficiency is achieved by providing a stable supply of pressurized air from a compressor driven by electric owner from an external power system and by returning power to the external power system from a secondary electric power generator driven by a turbine means using energy recovered from by-products of operation of the fuel cell system.

6. A fuel cell power generation system in accordance with claim 5, wherein said generator means additionally comprises a steam turbine, driven by excess steam produced in cooling said fuel cell, which drives an electric power generator for production of power which is returned to said external power system.

7. A fuel cell power generation system in accordance with claim 6, wherein said generator means additionally comprises a steam turbine, driven by excess steam produced in cooling said fuel cell, which is mechanically coupled to said gas turbine so as to also drive said electric power generator.

8. A fuel cell power generation system in accordance with claim 2, 4, 5, 6, or 7, wherein said gas turbine additionally comprises a variable nozzle for controlling an inlet angle of gas during partial load operation in the inlet side of said gas turbine.

9. A fuel cell power generation system comprising:
a fuel cell, having an anode gas space for collection of a fuel gas including a large amount of hydrogen and a cathode gas space for collection of air for use as an oxidizing agent, for generating electric power;
a fuel reformer for steam reforming natural gas into fuel gas which is supplied to said anode gas space of the fuel cell;
a gas turbine driven by exhaust gases from said reformer;
a steam turbine driven by steam generated as a by-product of cooling said fuel cell;
an electric generator driven by said gas turbine and said steam turbine for providing secondary electric power;
an air compressor for supplying pressurized air to said cathode gas space of the fuel cell;
an electric motor coupled to said circuit compressor; and
a control circuit having a pressure sensing device at the outlet side and an air flow rate control valve at the inlet side of said air compressor;
whereby, energy recovered from exhaust gases and steam generated as by-products in operation of said fuel cell system is recycled to generate secondary electric power, and the combination of the control circuit and the generated electric power supplemented by external power, particularly during start-up and load variations, provides a reliable stable supply of fuel cell air pressurized within a predetermined range of pressures.

* * * * *